Sept. 13, 1960
F. C. MOCK
2,952,275
VALVE
Filed Feb. 21, 1955
2 Sheets-Sheet 1
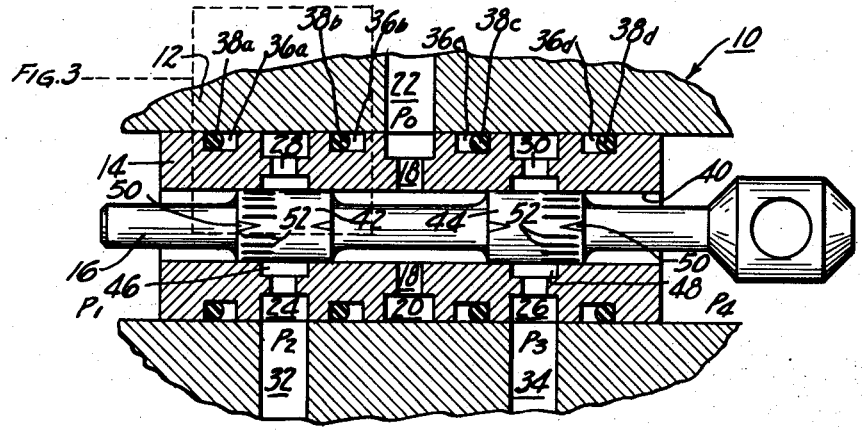
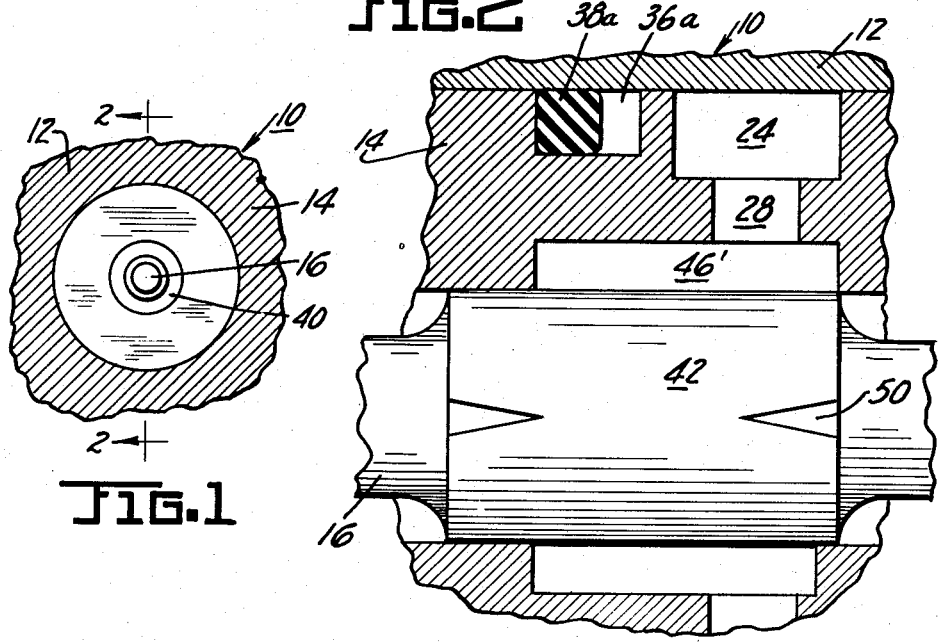
INVENTOR.
FRANK C. MOCK
BY
James L. O'Brien
ATTORNEY Sept. 13, 1960  F. C. MOCK  2,952,275
VALVE
Filed Feb. 21, 1955  2 Sheets-Sheet 2

INVENTOR.
FRANK C. MOCK
BY James L. O'Brien
ATTORNEY

United States Patent Office 2,952,275
Patented Sept. 13, 1960

2,952,275

VALVE

Frank C. Mock, South Bend, Ind., assignor to The Bendix Corporation, a corporation of Delaware Filed Feb. 21, 1955, Ser. No. 489,430

7 Claims. (Cl. 137—625.42)

The present invention relates to fluid valves and more particularly to fluid valves of the type used in hydraulic power systems.

It has been widely experienced in valves of this type, that if the valve member is fitted in its housing tight enough to prevent excessive leakage that the valve member tends to stick. In many applications the "break-out" force or force required to move the valve member after it has stuck reaches a considerable magnitude. In some applications the break-out force is of such a magnitude that movement of the valve member is impossible without destruction of the member itself. The break-out force or frictional drag, as it is sometimes called, tends to be irregular because, within the very small clearance limits of about one-hundred millionths of an inch commonly encountered in devices of this type, it is very difficult to obtain absolute dimensional accuracy of the housing and valve member.

In the past, various attempts have been made to prevent valves from sticking. Generally these attempts have involved methods for compensating for dimensional inaccuracies in the valve or housing. One method has provided means for centetring the valve in the housing by providing a circumferential groove in the periphery of the valve member to minimize side forces. This method while partially successful in some instances in reducing the magnitude of the break-out force fails to prevent valve sticking or "hydraulic lock" as it is sometimes called. Another method, if it can be called a method, simply provided for the enlargement of the clearance between the valve member and housing. The large leakage encountered makes the latter method undesirable or impracticable.

My observations indicate that while dimensional inaccuracies or mis-alignment are contributing factors to valve sticking, that a major cause of valve sticking is due to shrinkage of the valve housing around the valve member caused by fluid under pressure acting on the exterior of the housing.

Accordingly it is a principal object of the present invention to prevent a valve member from sticking in its housing by minimizing or preventing the contraction of the valve housing around the valve member.

The feature of the invention which renders the foregoing object possible of accomplishment is the provision of means in the interior of the housing, in the housing itself in the valve member or in a combination of the two, for applying fluid pressure to the internal wall of the housing in opposition to the fluid pressure acting on the external wall of the housing.

Other objects and advantages of the present invention will become apparent during the course of the following description, reference being had therein to the accompanying drawings, in which:

Figure 1 is an end view of a valve assembly mounted in a hydraulic actuator body;

Figure 2 is a section taken on line 2—2 of Figure 1;

Figure 6 is an enlarged view of a portion of Figure 2 showing an additional embodiment of the invention.

Figure 3:
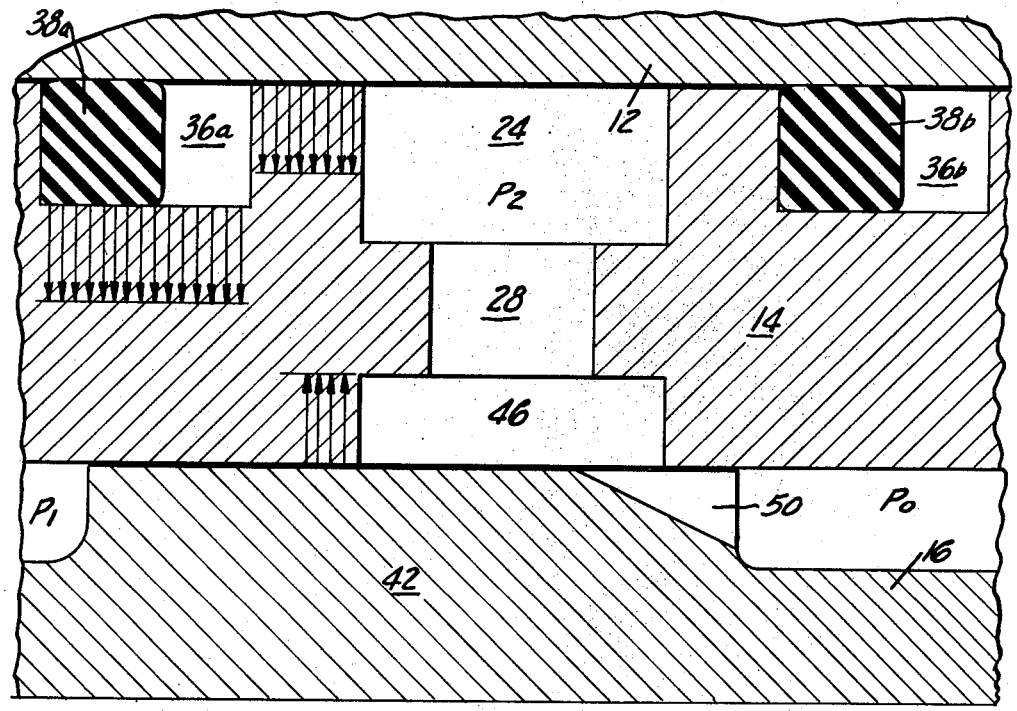
Figure 3 is an enlarged view of a portion of Figure 2 indicated thereon by a dotted line.

Referring to the drawings, a valve assembly 10 embodying my invention is shown mounted in a hydraulic actuator body 12, illustrated by a broken away section. As best shown in Figure 2, a valve 10 comprises a housing 14 having a valve member 16, sometimes referred to as a spool valve, reciprocably mounted therein.

The housing is formed with a plurality of inlet ports 18 that open into a common annulus 20 which is adapted to register with a conduit 22 in body 12 containing fluid under a high pressure designated $P_0$. Spaced longitudinally from inlet ports 18 and on opposite sides thereof, are located annuli 24 and 26 into which a plurality of outlet ports 28 and 30, respectively, open. Conduit 32 containing fluid at intermediate pressure $P_2$ and conduit 34 containing fluid at intermediate pressure $P_3$ are formed in body 12 for registration with annuli 24 and 26 respectively.

A periphery of housing 14 is formed with a plurality of longitudinally spaced grooves 36a, b, c, and d which contain sealing means such as O rings 38a, b, c and d, respectively, for sealing the annuli from each other and from the low pressure areas designated $P_1$ and $P_4$.

The hollow interior of housing 12 defines a cylindrical chamber 40 in which the spool or piston valve 16 slides. Valve 16 is provided with two longitudinally spaced spools or lands 42 and 44 which are adapted to register with the inner annuli 46 and 48 of outlet ports 28 and 30 respectively when the valve is in a neutral or predetermined position. On each end of each of the lands 42 and 44 there is formed a metering means such as the notches 50. In the embodiment shown there are two notches in each end of the lands spaced 180° apart. The number, shape and location of the notches may be varied in different applications and may be omitted entirely in some applications. Movement of the piston or valve 16 on either side of the neutral position connects one of the intermediate pressure conduits, $P_2$ or $P_3$, with the high pressure conduit $P_0$ and the other of said intermediate pressure conduits, $P_2$ or $P_3$, with a low pressure area, $P_1$ or $P_4$.

Figure 3 is an enlarged view of a portion of Figure 2 modified to illustrate the unbalanced forces acting on the housing 14 of the conventional valve. As shown, there is a leakage path for $P_2$ pressure between the housing 14 and the actuator body 12 from the annulus 24 to the sealing ring 38a. There is also a leakage path between the valve member 16 and housing 14 from annulus 46 or $P_2$ pressure to $P_1$ pressure. The force of $P_2$ pressure acting externally and internally on the housing 14 is illustrated vectorially in Figure 3 and clearly shows the excessive external pressure that acts radially inwardly to cause the housing to contract.

Figure 4:
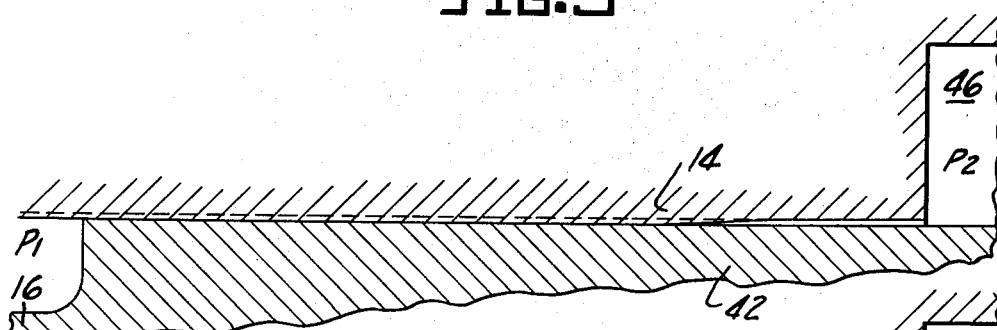
Figure 4 is an enlarged view of a portion of Figure 3 illustrating the contraction of the housing when a conventional valve member is utilized.

Figure 4 is an enlarged view of a portion of Figure 3 showing the manner in which the housing 14 contracts around a conventional valve member 16. The dotted line represents the normal position of the interior wall of the housing.

Figure 5:
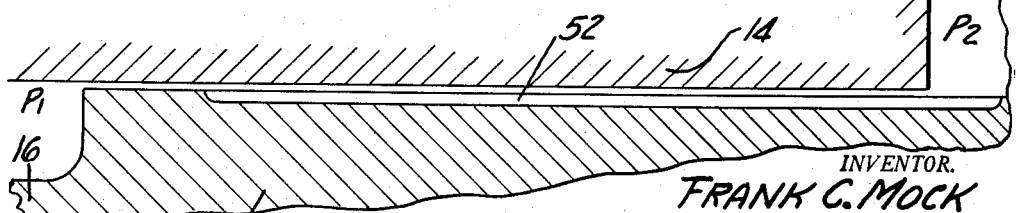
Figure 5 is an enlarged view of a portion of Figure 3 illustrating a valve member embodying the invention.

In Figures 2 and 5 there is shown a valve member embodying the invention wherein a plurality of longitudinal grooves or fluid reservoirs 52 are formed in the spools or lands 42 and 44 to conduct $P_2$ pressure between the housing and valve to oppose the externally acting $P_2$ pressure. Grooves 52 terminate in spaced relation to the end of lands 42 and 44 so as to prevent a leakage path from being established between $P_2$ and $P_1$ or $P_4$ pressure. In practice, where there is a clearance of about one-hundred millionths of an inch between the housing and valve, the groove may conveniently terminate one thirty-second of an inch from the end of the land to provide a sealing surface three hundred times longer than its width which is usually sufficient to prevent undesirable leakage. The shape and area of the grooves 52 and the length of lands 42 and 44 are designed with relation to the area of the external surface of housing 14 which is subject to $P_2$ contracting pressure to eliminate contraction entirely or to provide an advantageous diminution of contraction so that reasonable clearances may be employed without sticking. Groves 52 may be located either in the valve member 16 itself or in the internal wall of the housing 14, the important feature being that $P_2$ expansion pressure is conducted between the housing and valve to oppose the external $P_2$ contracting pressure to prevent valve sticking.

In Figure 6 a modification of my invention is shown wherein it is intended that the structure be the same as in previous embodiments except that the grooves 52 are eliminated and the inner annulus 46' is widened to provide a chamber extending longitudinally a distance substantially equal to the distance between sealing ring 38 and annulus 24 whereby $P_2$ pressure acting externally and internally may be substantially balanced.

It will be seen from the above description of my invention that hydraulic actuator valves formed in this manner resist contraction and remain free from sticking, an important advantage being that many existing valves may be modified to incorporate the invention and obtain its advantages with a minimum of expense.

I claim:

1. A valve comprising a housing, a chamber in said housing, a valve member mounted in said chamber, a plurality of axially spaced outlet ports in said housing, said housing having exterior area adjacent said outlet ports exposed to outlet fluid pressure tending to urge said housing into engagement with said valve member, an inlet port in said housing, a plurality of axially spaced lands on said member, said lands adapted to close each of said outlet ports when said member is in a predetermined position, and a longitudinal groove formed in each of said lands terminating in spaced relation with the ends of said lands, said grooves being in direct communication with said outlet ports when said member is in said predetermined position and extending a sufficient distance to substantially counterbalance the fluid pressure acting on said housing exterior areas.

2. A valve comprising a housing, a chamber in said housing, a valve member mounted in said chamber, a plurality of longitudinally spaced outlet ports in said housing, said housing having exterior areas adjacent said outlet ports exposed to outlet fluid pressure tending to urge said housing into engagement with said valve member, an inlet port in said housing, longitudinally spaced lands on said member adapted to close each of said outlet ports when said member is in a predetermined position, metering means in each of said lands, and at least one longitudinally extending chamber formed on the surface of each of said lands and spaced from the ends thereof, said chambers being exposed to said outlet ports when said member is in said predetermined position and extending a sufficient distance to substantially counterbalance the fluid pressure acting on said housing exterior areas.

3. A valve comprising a body, a housing in said body, a chamber in said housing, a valve member mounted in said chamber, a plurality of longitudinally spaced outlet ports in said housing and said body, an inlet port in said housing and said body, sealing means located on each side of the external portion of each outlet port between said body and housing, the external portion of said housing between said outlet ports and sealing means being exposed to outlet fluid pressure tending to urge said housing into engagement with said valve member, longitudinally spaced lands on said member adapted to close each of said outlet ports when said piston is in a predetermined position, and a depression formed in the surface of each of said lands extending a distance substantially equal to the distance from one of said outlet ports to the respective sealing means therefor when the member is in said predetermined position whereby the fluid pressure acting on the external portion of said housing is substantially counterbalanced, said depressions being spaced from the ends of said lands.

4. A valve comprising a body, a housing in said body, a chamber in said housing, a valve member mounted in said chamber, an inlet and an outlet port in said housing and said body, sealing means located on each side of the external portion of said outlet port between said body and said housing, the external portion of said housing between said outlet port and sealing means being exposed to outlet fluid pressure tending to urge said housing into engagement with said valve member, a land on said member adapted to close said outlet port when said member is in a predetermined position, a depression formed on the surface of said land and extending substantially from said sealing means to said outlet port when the member is in predetermined position whereby the fluid pressure acting on the external portion of said housing is substantially counterbalanced, said depression being spaced from the ends of said land and in direct communication with said outlet port when said member is in said predetermined position.

5. A valve comprising a body, a housing in said body, a chamber in said housing, an inlet and an outlet port in said housing communicating with said chamber, sealing means in the exterior wall of said housing engaging said body between said outlet port and a point of lower pressure, the exterior wall of said housing between said outlet port and sealing means being subjected to outlet fluid pressure tending to urge said housing into engagement with said valve member, a balancing chamber formed in the interior wall of said first mentioned chamber extending longitudinally a distance substantially equal to the distance between said sealing means and said outlet port, said balancing chamber being in direct communication with the outlet port whereby the fluid pressure acting on the exterior wall of said housing is substantially counterbalanced, and a unitary member in said chamber extending longitudinally a distance greater than the distance of said balancing chamber for controlling the communication between said inlet and said outlet ports.

6. A valve comprising a housing, a chamber in said housing, a piston mounted in said chamber, an inlet port and an outlet port in said housing, said ports being longitudinally spaced from each other, said housing having an exterior area adjacent said outlet port exposed to outlet fluid pressure tending to urge said housing into engagement with said piston, said piston being movable to one position to establish communication between said ports and to another position to prevent communication between said ports, and a plurality of longitudinal grooves formed on the surface of said piston and spaced from the ends thereof, said grooves having a combined area sufficient to substantially counterbalance the fluid pressure acting on the said exterior area of said housing and having a length less than the distance between said spaced ports and being in direct communication with one of said ports.

7. A valve comprising a housing, a chamber in said housing, a piston mounted in said chamber, an inlet port and an outlet port in said housing, said ports being longitudinally spaced from each other, said housing having an exterior area adjacent said outlet port exposed to outlet fluid pressure tending to urge said housing into engagement with said piston, said piston being movable to one position to establish communication between said ports and to another position to prevent communication between said ports, and a plurality of longitudinally extending depressions formed on the surface of said piston and being spaced from the ends thereof, said depressions having a combined area sufficient to substantially counterbalance the fluid pressure acting on the said exterior area of said housing and having a length less than the distance between said spaced ports and said depression being in direct communication with one of said ports.

References Cited in the file of this patent

UNITED STATES PATENTS

| | | |
|---|---|---|
| 1,820,653 | Ernst | Aug. 25, 1931 |
| 2,403,519 | Gardiner | July 9, 1946 |
| 2,450,481 | May | Oct. 5, 1948 |
| 2,552,843 | Clifton | May 15, 1951 |
| 2,699,756 | Miller | Jan. 18, 1955 |
| 2,712,422 | Gerwig | July 5, 1955 |
| 2,747,611 | Hewitt | May 29, 1956 |
| 2,747,612 | Lee | May 29, 1956 |
| 2,764,181 | Richolt | Sept. 25, 1956 |
| 2,832,317 | Henry | Apr. 29, 1958 |